Patented May 10, 1949

2,469,396

UNITED STATES PATENT OFFICE 2,469,396

PREPARATION OF DINITROPARAFFINS

John H. McCracken, Cumberland, Md., and George S. Crandall, Woodbury, N. J., assignors to Socony-Vacuum Oil Company, Incorporated, a corporation of New York No Drawing. Application January 29, 1946, Serial No. 644,196

6 Claims. (Cl. 260—644)

This invention has to do with a new method for the preparation of gem-dinitroparaffins and, more particularly, has to do with a new method for the preparation of those gem-dinitroparaffins which are characterized by attachment of both nitro groups to a secondary carbon atom.

In the past, several attempts have been made to prepare gem-dinitroparaffins of the type represented by the following general formula:

I. 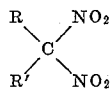

wherein R and R' may be the same or different alkyl groups. All previous attempts, however, have been occasioned by little success, inasmuch as the starting materials or reactants have been relatively expensive, the yields of the desired products have been small, etc., and, in general, all of such methods have proven uneconomical. For example, ter Meer (Liebig's Annalen der Chemie, 181, 1, (1876)) and Nef (ibid. 280, 263 (1894)) prepared secondary gem-dinitroparaffins by reaction of an alkyl halide with a silver salt of a primary gem-dinitroparaffin. J. Bredt (Berichte, 15, 2318 (1882)) reported that a small amount of 2,2-dinitropropane was obtained when isovaleric acid was nitrated at 0° C. The same dinitropropane was also prepared in rather small yields by Meyer and Locher (Annalen 180, 133 (1876)) by an oxidation method, chromic acid being added to oxidize propyl pseudonitrole in an acetic acid solution. The highest yield of the aforesaid dinitropropane obtained by Meyer and Locher was 35%; however, they were not able to repeat this performance consistently. Meyer and Locher also reported that a small yield, 17%, of the same dinitropropane was obtained when propyl pseudonitrole was heated near its melting point.

We have now discovered an inexpensive method whereby substantial yields of secondary gem-dinitroparaffins are obtained. Specifically, the present method involves contacting a pseudonitrole with nitrogen tetroxide ($N_2O_4$ or $NO_2$) at a temperature up to about 10° C. above the decomposition temperature of the pseudonitrole.

The pseudonitroles contemplated herein for conversion to their corresponding gem-dinitroparaffins are represented by the general formula:

II. 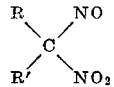

wherein R and R' may be the same or different alkyl groups and may be unsubstituted or substituted with such substituents as halogen, nitro, aryl, etc. While all of the pseudonitroles so defined are contemplated for use, propyl pseudonitrole, which is converted herein to 2,2-dinitropropane, is particularly preferred. The pseudonitroles may be prepared by any of the methods well known in the art. However, an inexpensive and preferred method is that which is described in Patent No. 2,370,185 issued on February 27, 1945 to E. M. Nygaard, J. H. McCracken and T. T. Noland.

In the present process, the reaction temperature may be varied considerably up to about 10° C. above the decomposition temperature of the pseudonitrole reactant. As indicated hereinafter, by way of illustration, temperatures as low as −10° C. to 50° C. are suitable for converting propyl pseudonitrole to 2,2-dinitropropane. Temperatures up to about 85° C. are those which are to be used for the foregoing conversion, inasmuch as the decomposition temperature of propyl pseudonitrole is 75° C.

In order to illustrate the present invention, a typical and preferred gem-dinitroparaffin—2,2-dinitropropane—was prepared as described in detail in the following examples:

Example I

Propyl pseudonitrole (12 parts) and carbon tetrachloride (120 parts) were placed in a three-necked flask fitted with mechanical stirrer, reflux condenser, and gas inlet tube. Through the gas inlet tube were introduced oxides of nitrogen (generated from 14 parts sodium nitrite and 46 g. nitric acid). After all of oxides of nitrogen were added, blue color of pseudonitrole was substantially discharged. Excess oxides of nitrogen were removed by blowing with nitrogen. The solvent was then distilled off and the product isolated by steam distillation. Yield of dinitropropane was 3.6 parts or 27% of theoretical.

Example II

Liquid nitrogen tetroxide, about 75 parts by weight, was placed in a glass beaker in an ice bath. The nitrogen tetroxide was stirred by a mechanical stirrer and maintained at approximately 0° C. by means of the ice bath. Propyl pseudonitrole, about 30 parts by weight, was added in small quantities to the nitrogen tetroxide over the period of ½ hour. Additional nitrogen tetroxide approximately 35 parts by weight was added as additional solvent. Mixture was maintained at a temperature of 0–5° C. for 1 hour, then allowed to warm up slowly to approximately 25° C. at which time substantially all of the solid had dissolved or reacted. The reaction product was isolated by distillation of the excess oxide of nitrogen and steam distillation of residual product whereupon 12 parts by weight of 2,2-dinitropropane were obtained. This corresponds to a yield of 36%.

It will be apparent from the foregoing illustrative examples that the present method is a valuable means for preparing secondary gem-dinitroparaffins. As is well known to those familiar with the chemical art, such compounds are valuable intermediates in chemical synthesis; and recently these compounds have been found to be extremely effective ignition improvers for diesel type fuels.

Although the present invention has been illustrated hereinabove by the preparation of a specific secondary gem-dinitroparaffin and has been illustrated by specific procedures, it is to be understood that these are but preferred embodiments of this new method for the preparation of secondary gem-dinitroparaffins. The present invention, however, is not to be construed as limited thereto, but is to be broadly construed in the light of the defining language of the appended claims.

We claim:

1. The method of preparation of a dinitroparaffin having the general formula:

wherein R and R' are lower alkyl groups, which comprises contacting a pseudonitrole at a temperature up to about 10° C. above its decomposition temperature with nitrogen tetroxide, said pseudonitrole having the general formula:

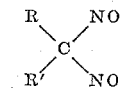

wherein R and R' are as defined above.

2. The method of preparation of a secondary gem-dinitroparaffin which comprises, contacting a lower alkyl pseudonitrole at a temperature up to about 10° C. above its decomposition temperature with nitrogen tetroxide, whereby a reaction mixture containing said dinitroparaffin is formed; and separating said dinitroparaffin from said reaction mixture.

3. The method of preparation of a secondary gem-dinitroparaffin which comprises, contacting a monomeric lower alkyl pseudonitrole at a temperature up to about 10° C. above its decomposition temperature with nitrogen tetroxide, whereby a reaction mixture containing said dinitroparaffin is formed; and separating said dinitroparaffin from said reaction mixture.

4. The method of preparation of 2,2-dinitropropane which comprises, contacting propyl pseudonitrole at a temperature up to about 85° C. with nitrogen tetroxide, whereby a reaction mixture containing 2,2-dinitropropane is formed; and separating said 2,2-dinitropropane from said reaction mixture.

5. The method of preparation of 2,2-dinitropropane which comprises, contacting propyl pseudonitrole at about 25° C. with nitrogen tetroxide, whereby a reaction mixture containing 2,2-dinitropropane is formed; and separating said 2,2-dinitropropane from said reaction mixture.

6. The method of preparation of 2,2-dinitropropane which comprises, contacting propyl pseudonitrole at about 80° C. with nitrogen tetroxide and carbon tetrachloride, whereby a reaction mixture containing 2,2-dinitropropane is formed; and separating said 2,2-dinitropropane from said reaction mixture.

JOHN H. McCRACKEN.
GEORGE S. CRANDALL.

REFERENCES CITED

The following references are of record in the file of this patent:

Born, "Berichte deutsche chem. Gesell.," vol. 29 (1896) pages 93–101.

Rheinboldt, "Berichte deutsche chem Gesell.," vol. 60 (1927), pages 250–51.

Scholl, "Berichte deutsche chem. Gesell.," vol. 23 (1890) pages 3490–3495.

Meyer et al., "Liebig's Annalen," vol. 180 (1875), page 144 and page 147.

Charlton et al., "Jour chem. Soc.," (London) 1932, page 36.

Ponzio, "Gazz. Chim. Ital." Vol. 27 (1897), pages 271–275.